April 5, 1960 R. E. HOPP 2,931,291
DIGITAL PRINTER AND CARD PUNCH MACHINE
Filed Aug. 12, 1957 9 Sheets-Sheet 1
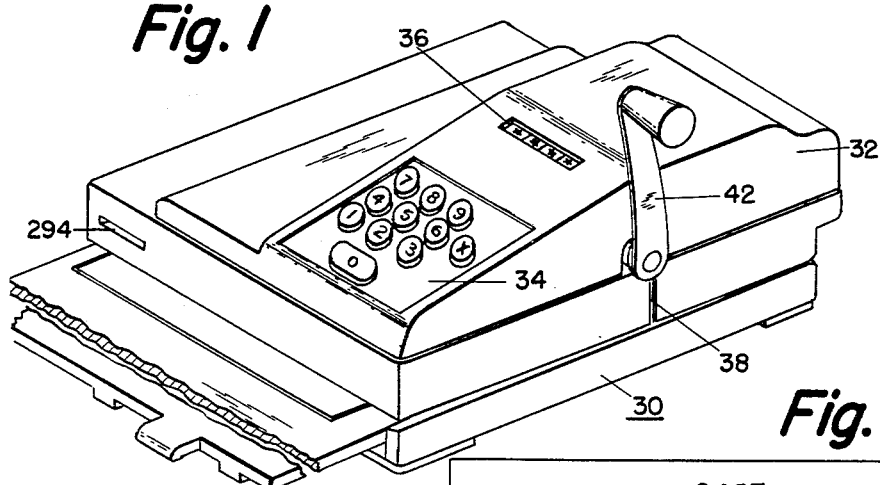
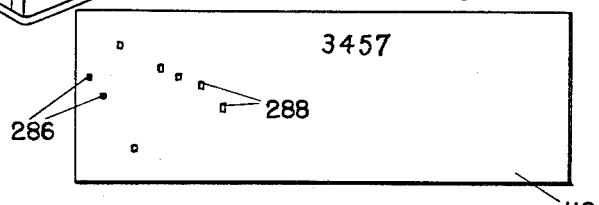
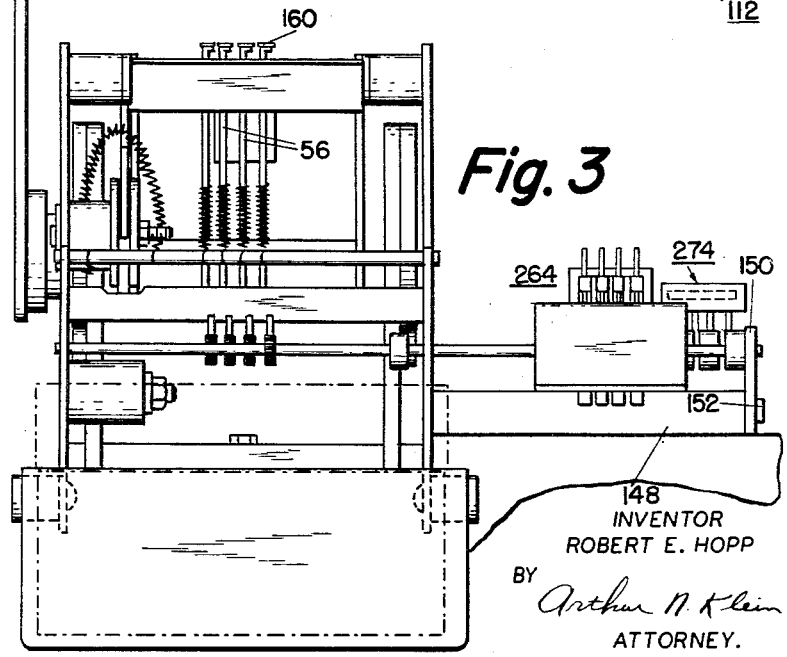
INVENTOR
ROBERT E. HOPP
BY
Arthur N. Klein
ATTORNEY.

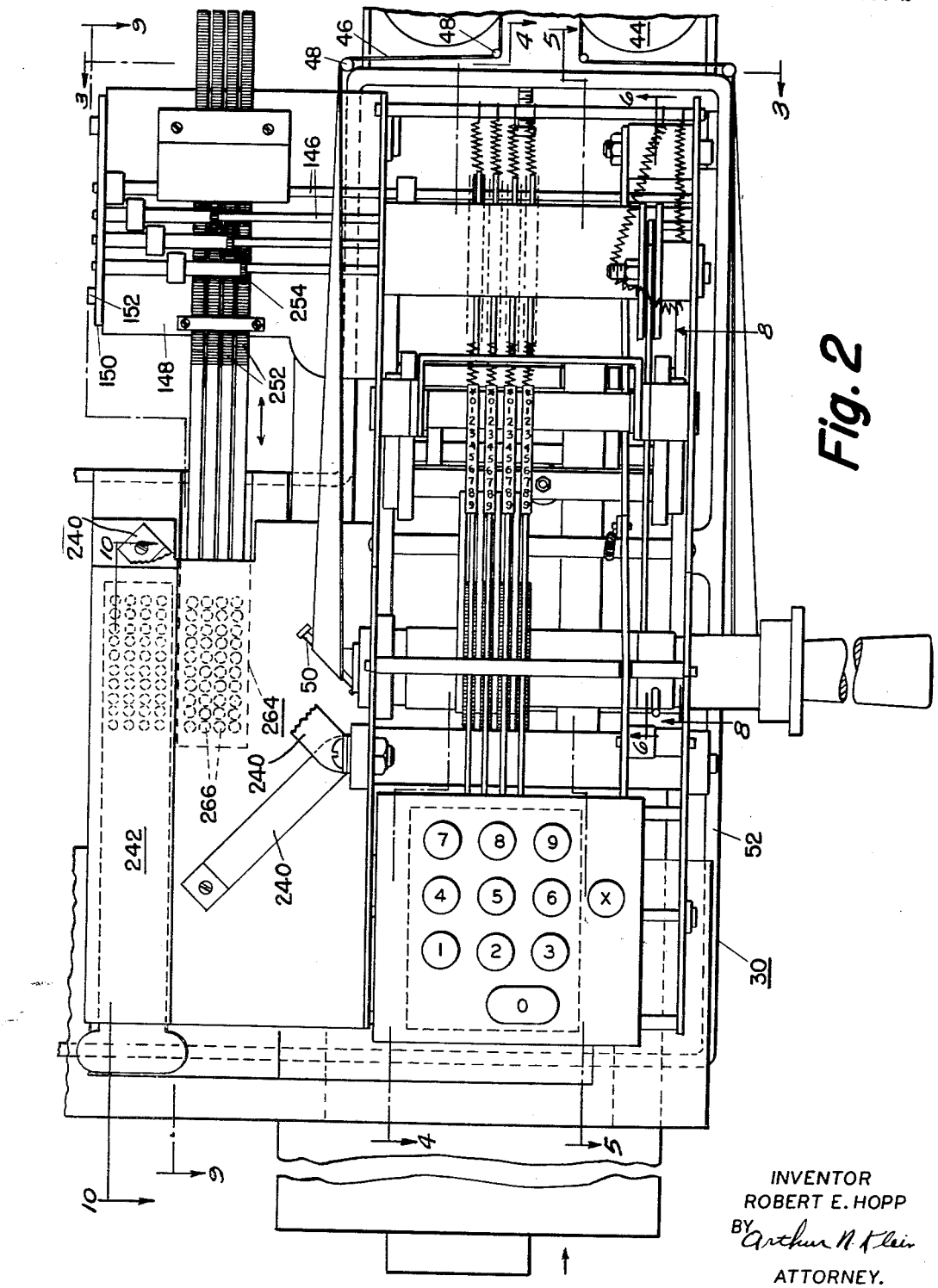

April 5, 1960 R. E. HOPP 2,931,291
DIGITAL PRINTER AND CARD PUNCH MACHINE
Filed Aug. 12, 1957 9 Sheets-Sheet 3

INVENTOR
ROBERT E. HOPP
BY Arthur N Klein
ATTORNEY.

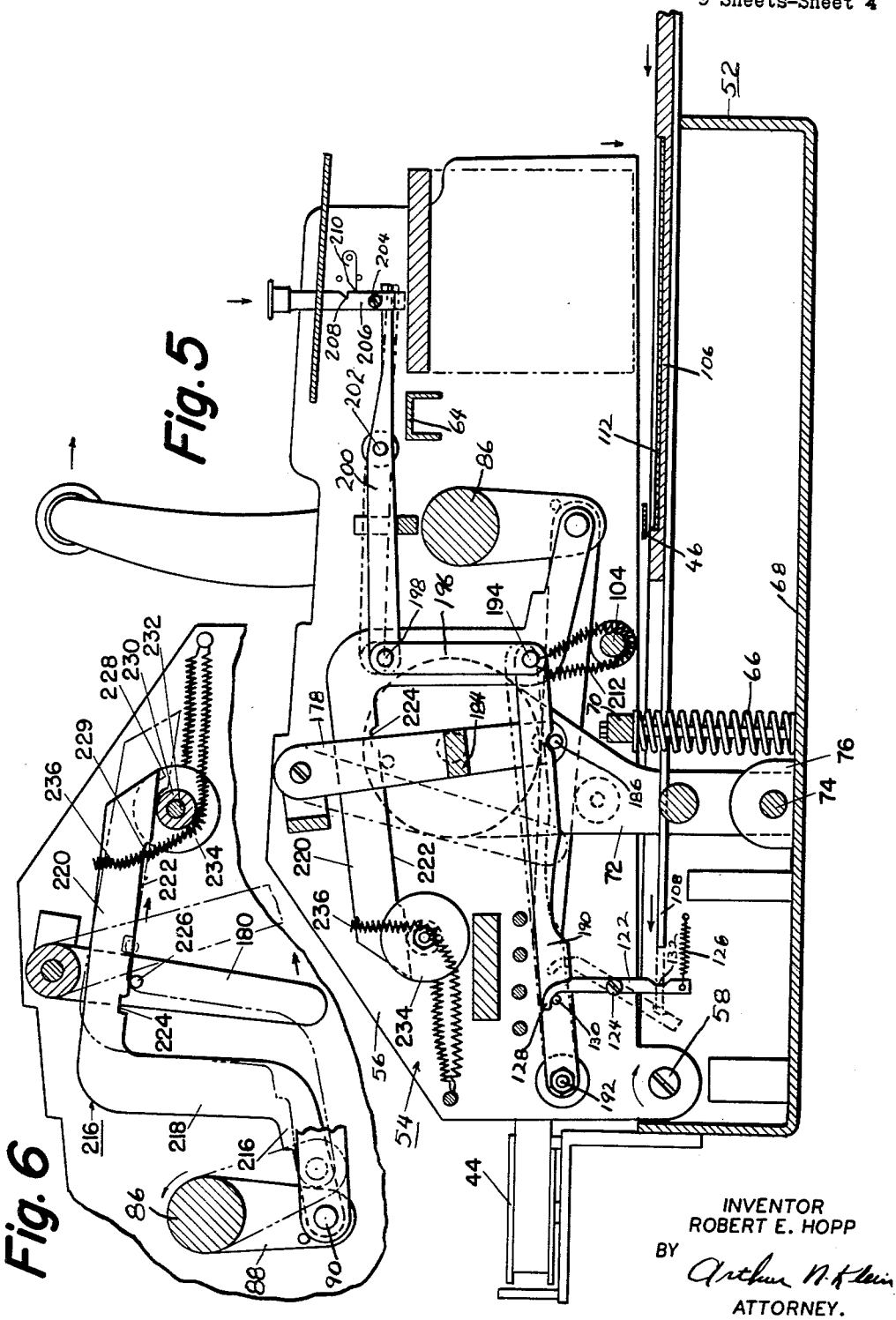

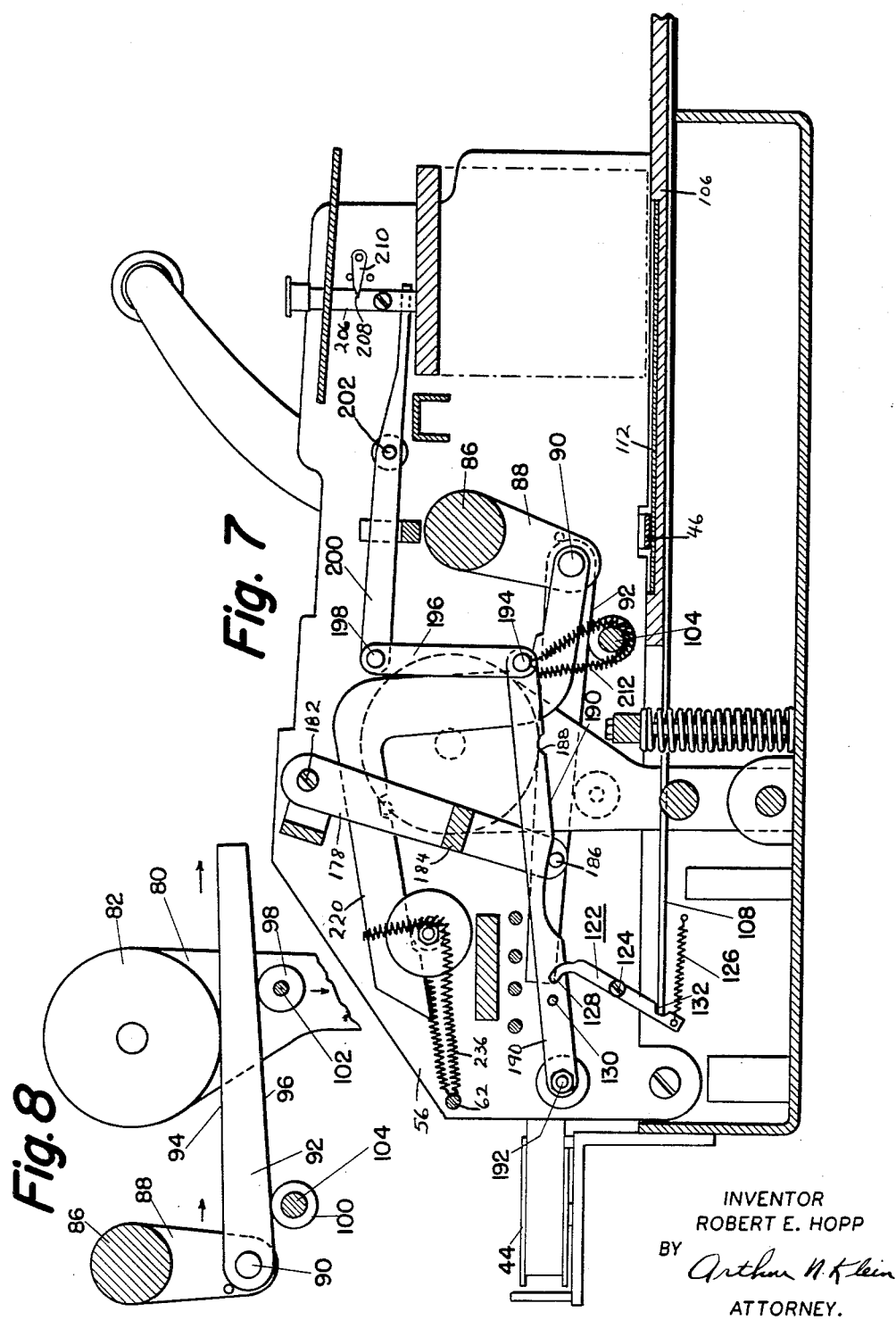

April 5, 1960 R. E. HOPP 2,931,291
DIGITAL PRINTER AND CARD PUNCH MACHINE
Filed Aug. 12, 1957 9 Sheets-Sheet 6
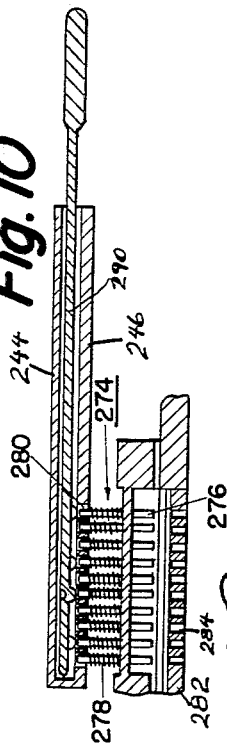
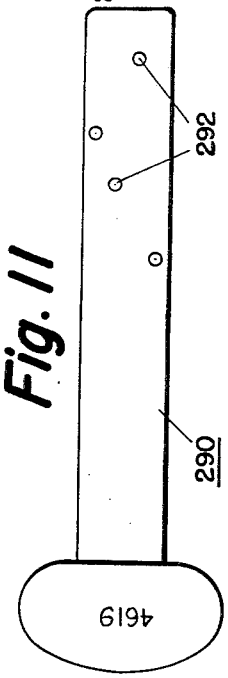
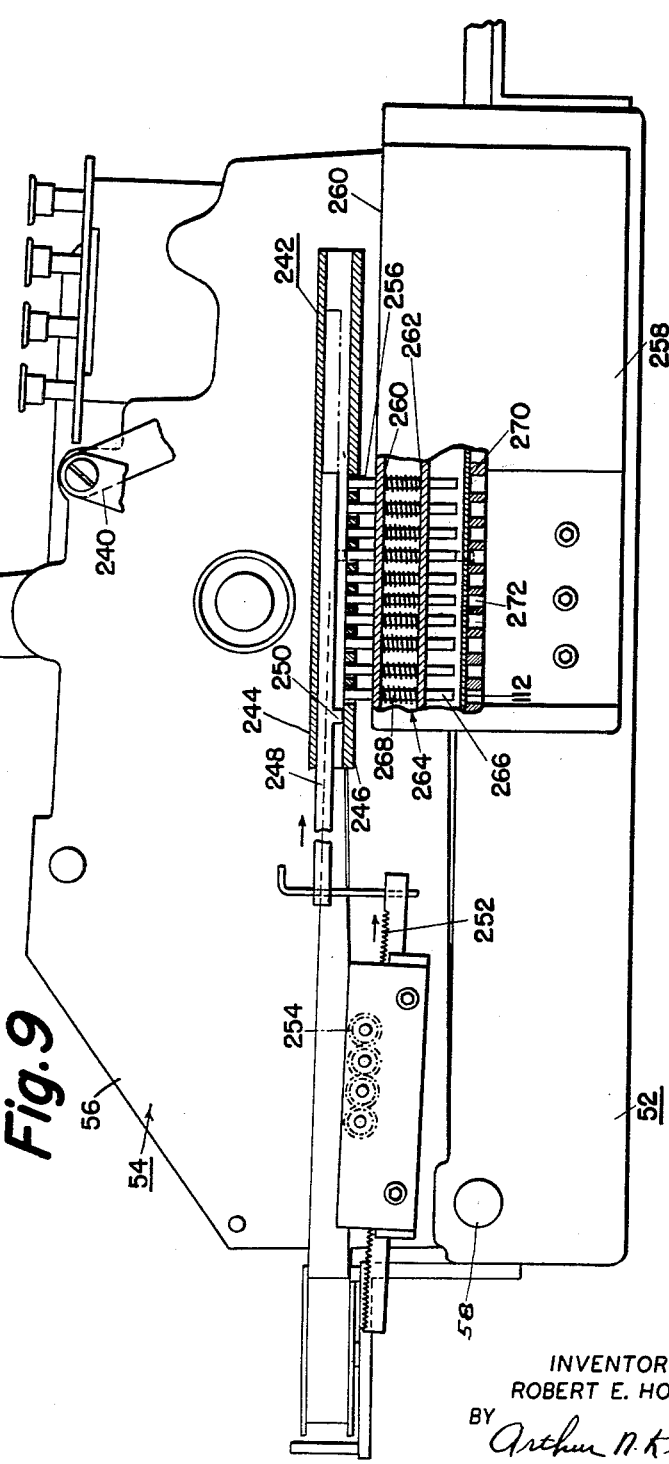
INVENTOR
ROBERT E. HOPP
BY Arthur N. Klein
ATTORNEY.

April 5, 1960  R. E. HOPP  2,931,291
DIGITAL PRINTER AND CARD PUNCH MACHINE
Filed Aug. 12, 1957
9 Sheets-Sheet 7

INVENTOR
ROBERT E. HOPP
BY
*Arthur N. Klein*
ATTORNEY.

April 5, 1960            R. E. HOPP            2,931,291
DIGITAL PRINTER AND CARD PUNCH MACHINE
Filed Aug. 12, 1957            9 Sheets-Sheet 8

INVENTOR.
ROBERT E. HOPP
BY
Arthur N. Klein
ATTORNEY

April 5, 1960 R. E. HOPP 2,931,291
DIGITAL PRINTER AND CARD PUNCH MACHINE
Filed Aug. 12, 1957 9 Sheets-Sheet 9
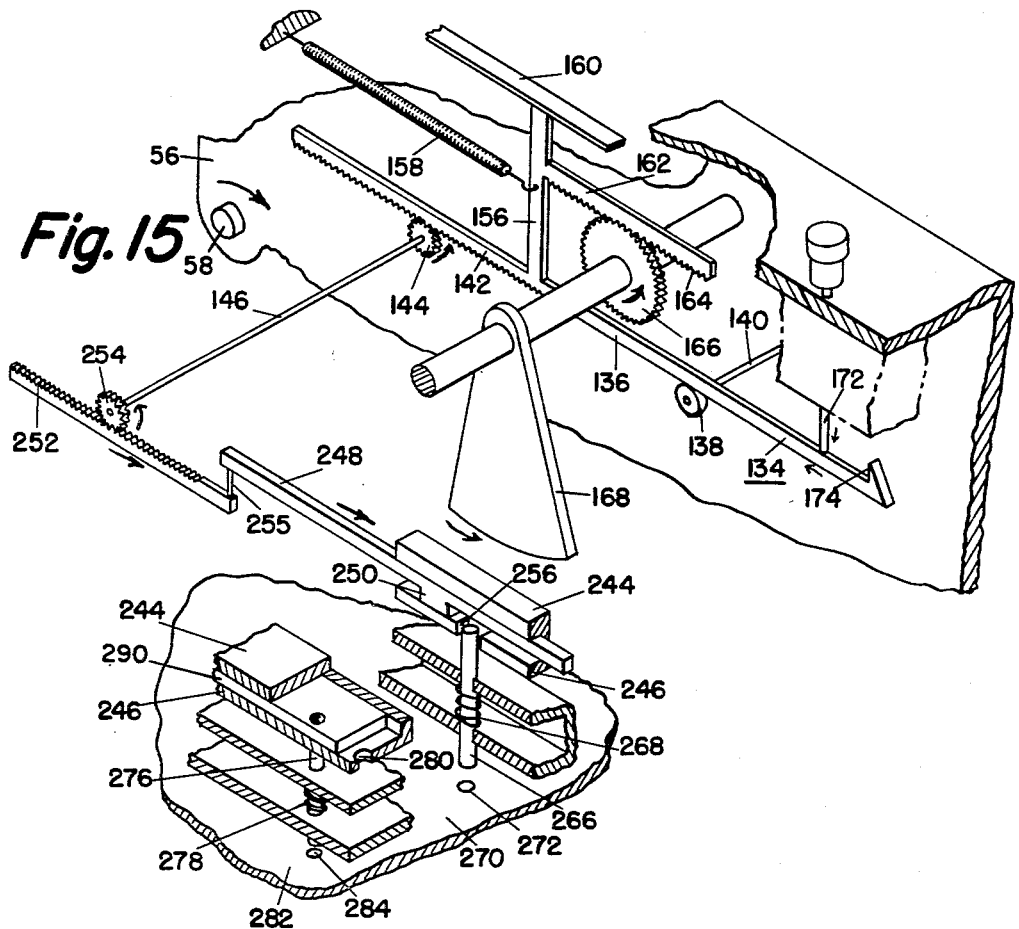
INVENTOR.
ROBERT E. HOPP
BY
Arthur N. Klein
ATTORNEY United States Patent Office 2,931,291
Patented Apr. 5, 1960

2,931,291
DIGITAL PRINTER AND CARD PUNCH MACHINE

Robert E. Hopp, Mount Vernon, N.Y., assignor to Safeguard Corporation, Lansdale, Pa., a corporation of Delaware Application August 12, 1957, Serial No. 677,703

40 Claims. (Cl. 101—19)

The present invention relates generally to the art of printing and punching data and more particularly to the simultaneous printing and punching of corresponding data on a check or card or the like to permit visual use as well as use in conventional punched-card classifying machines, for example the "I.B.M." machines manufactured by International Business Machines Corp.

An object of this invention is to provide a new and useful machine for printing and punching data on a check or card or the like. Another object of the invention is to provide a novel machine which simultaneously prints and punches corresponding data on a check or card or the like. Still another object is to provide new and useful mechanism for simultaneously printing and punching the same variable data on a check or card or the like and for further punching fixed data at more or less the same time.

A further object of this invention is to provide novel carriage operating mechanism in a machine for simultaneously printing and punching corresponding data. An additional object of the invention is to provide new and useful connecting mechanism for actuating both printing and punching mechanism so that the same information or data when fed to the machine (by means of a keyboard or other actuating device) can be simultaneously printed and punched on a check or card or the like.

Other objects and advantages of the present invention are apparent in the following detailed description, appended claims and accompanying drawings.

For the purpose of illustrating the invention, forms thereof which are presently preferred are described and illustrated herein; it being understood, however, that the invention is not limited to the precise arrangements and instrumentalities disclosed and that various changes can be made therein without departing from the spirit or essential attributes of this invention.

Referring to the accompanying drawings in which like reference characters indicate like parts throughout:

Figure 1 is a perspective view of a printing and punching machine forming one embodiment of the present invention which is constructed and arranged simultaneously to print and punch on a card or check or the like variable data or information fed to it from a keyboard of the 10-key type and also to punch non-variable data or information fed to it by a separate pre-coded key or the like.

Figure 2 is a fragmentary top plan view of the embodiment of Fig. 1, as it appears with the outer case or cover removed.

Figure 3 is a transverse sectional view generally along the line 3—3 of Fig. 2.

Figure 5 is a longitudinal sectional view generally along the line 5—5 of Fig. 2.

Figure 6 is a longitudinal sectional view generally along the line 6—6 of Fig. 2.

Figure 7 is a longitudinal sectional view like that of Fig. 5 but showing the handle-rotated pivoted printing and punching position of the carriage.

Figure 8 is a longitudinal sectional view generally along the line 8—8 of Fig. 2.

Figure 9 is a longitudinal sectional view generally along the line 9—9 of Fig. 2.

Figure 10 is a longitudinal sectional view generally along the line 10—10 of Fig. 2.

Figure 11 is a top plan view of a key for insertion into the machine of Fig. 1 for supplying nonvariable data thereto.

Figure 12 is a top plan view of a card which has been stamped and punched by the machine of the present invention.

Figure 15 is a schematic perspective view of the mechanism for effecting simultaneous printing and punching operations.

Figure 4:
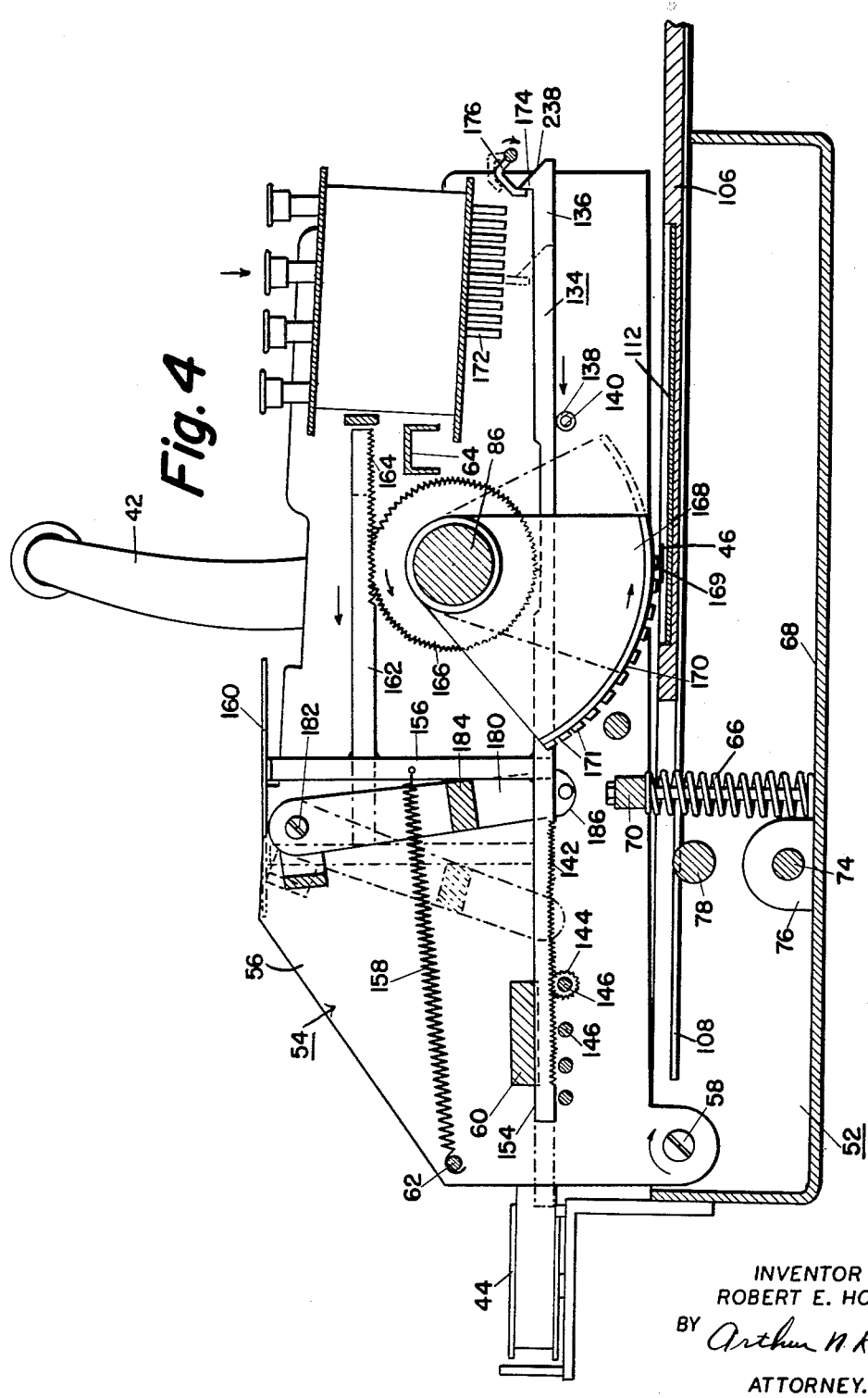
Figure 4 is a longitudinal sectional view generally along the line 4—4 of Fig. 2.

According to one embodiment of the present invention, shown generally in Figs. 1 and 2, I may provide a frame or chassis 30, over the top of which fits a removable cover or housing 32. Conventional screws or spring clips (not shown) may be employed to attach the cover to the chassis. The top wall of the cover 32 may be provided with a generally rectangular opening to enable it to fit over the faceplate of a conventional 10-key keyboard mechanism 34 and is also provided with a window 36 through which the numbers or other variable data fed to the machine by the keyboard may be viewed. A slot 38 extending upward from the bottom edge of one of the side walls of the cover 32, enables the cover to be fitted over, and lifted off, the connecting pin 40 for the operating handle 42, in the case of a manually operated machine. Of course, in an electrically operated machine, the conventional motor and driving gears are fully enclosed and the handle 42 and pin 40 eliminated, so that the slot 38 is unnecessary.

At the rear of the chassis 32, provision is made for mounting, in a horizontal plane, a pair of reels 44 for inked ribbon 46 like that used in typewriters. The ribbon 46 comes off the reels 44 in a generally vertical plane, passes over vertical pins 48 to extend longitudinally forward along the chassis 32 to a point at which is turned downward and then runs transversely across the chassis, in a generally horizontal plane, below printing quadrants to be described hereinbelow; the turning of the ribbon being accomplished by means of rollers 50, as shown in Figs. 2-5. Conventional means (not shown) are provided for advancing the ribbon 46 with each operation of the machine and for reversing the direction of movement of the ribbon just before either reel 44 is fully unwound; said means being widely employed in the typewriter art and requiring no detailed explanation herein.

The frame includes a fixed base 52, to the rear end of which a carriage 54 is pivotally mounted. The carriage 54 includes left and right vertical side plates 56 connected to the base 52 at their lower rear corners by pivot pins 58, as shown in Figs. 2, 3, 4, 5 and 14, for example. The side plates 56 are rigidly interconnected by various horizontal transverse members including a large member 60 of rectangular cross-section near the rear; a smaller cylindrical member 62 adjacent the rear; and a channel member 64 of inverted U-shaped cross-section near the front of the carriage, as shown in Figs. 2, 3 and 4.

The carriage 54 is normally tensioned to the raised position shown in Figs. 4 and 5 by a pair of laterally spaced vertically disposed helical compression springs 66, the lower ends of which are seated upon the bottom wall 68 of the base, while the upper ends bear yieldingly against the bottom of a transverse connecting bar 70 of the carriage, disposed at the lower edge of the carriage and spaced longitudinally forward of the pivot pins 58, as shown in Figs. 4, 5 and 7.

In order to effect the printing and punching action of the machine (to be hereinafter described), it is necessary to tilt the forward end of the carriage 54 (clockwise in Figs. 4, 5 and 7) from the raised solid line position of Fig. 4 to the depressed or lowered position shown in dash-dot lines in Fig. 4 and also shown in Fig. 7. This tilting is accomplished by the following mechanism.

Figure 14:
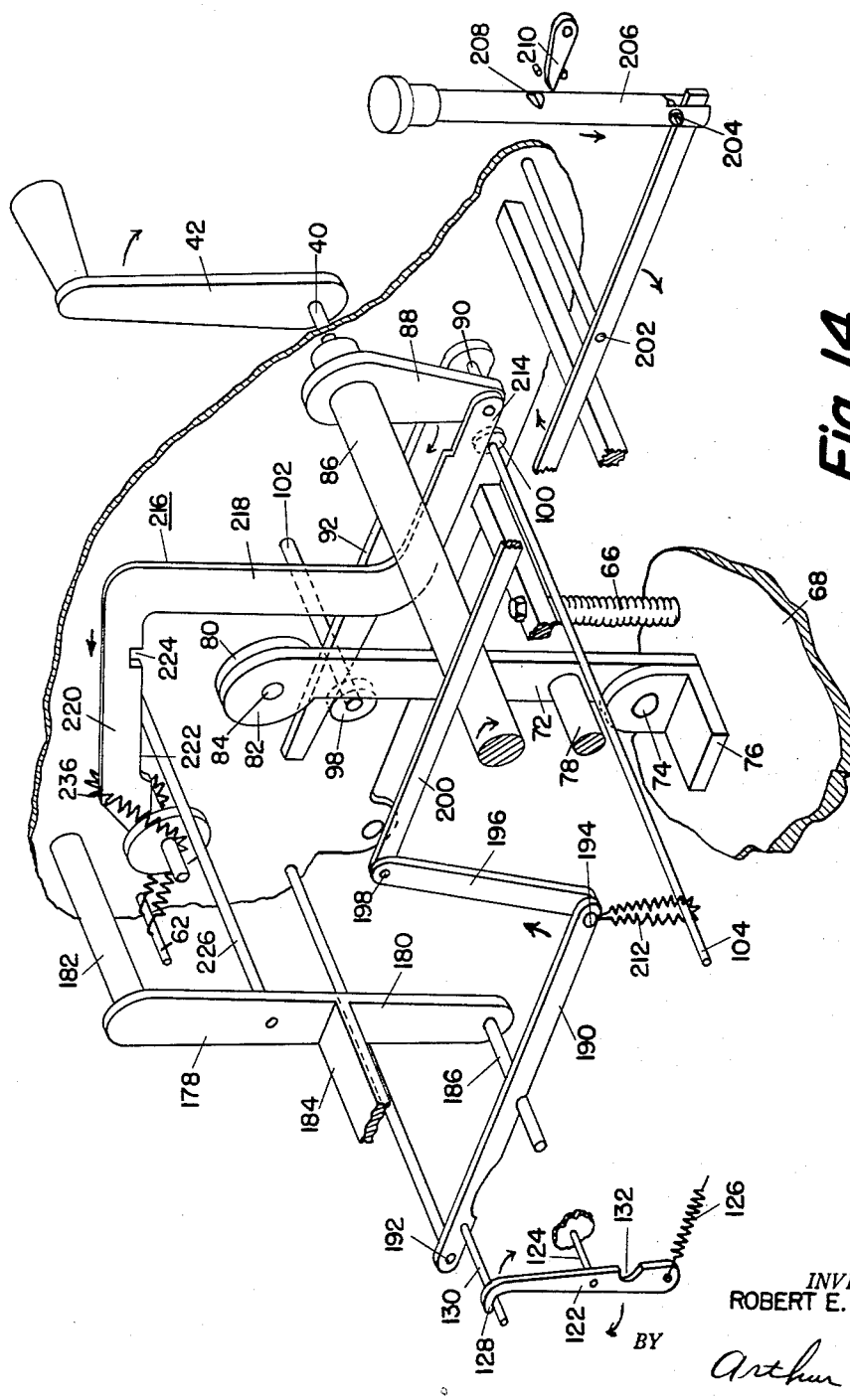
Figure 14 is a schematic perspective view of the handle-actuated carriage depressing mechanism of the embodiment of Figs. 1 and 2.

Spaced slightly inward from each of the side plates 56 of the carriage 54 and disposed in a vertical plane generally parallel to the side plate, are a pair of uprights 72, one of which is best shown in the schematic perspective view of Fig. 14. A bolt 74 secures the lower end of each upright 72 to the upstanding wall of an L-shaped anchorage plate 76 which is welded or otherwise fastened to the base bottom wall 68. Additionally, a transverse cross-piece 78 interconnects the two uprights 72 somewhat above the bolts 74.

A relatively large roller 80 is rotatably mounted on the outer side of the enlarged upper end 82 of each upright 72 by means of a pin 84; the roller 80 being disposed laterally intermediate the upright and the adjoining carriage side plate 56, as shown in Figs. 2, 3, 8 and 14.

A main shaft 86 extends horizontally and transversely intermediate the carriage side plates 56, upon which its ends are rotatably mounted in conventional manner. The operating handle 42 and pin 40 are fixedly connected to the right hand end of the shaft 86, so that operation of the handle 42 causes corresponding rotation of the shaft 86.

Attached to the shaft 86 at points spaced somewhat from the adjoining side plates 56 are a pair of downwardly-directed crank arms 88, one of which is shown in Figs. 5, 6, 7, 8 and 14. A pin 90 extends through the lower end of each crank arm 88; the crank arm being disposed in a generally longitudinal plane and the pin 90 protruding horizontally and transversely on both sides of the crank arm, as best shown in Fig. 14.

Pivotally mounted on the outer protruding portion of the pin 90 and disposed laterally intermediate the crank arm 88 and the adjoining carriage side plate 56, is a wedge arm 92 which extends longitudinally and rearwardly from the pin and which has top and bottom surfaces 94 and 96. The wedge arm 92 has a relatively larger vertical dimension at its forward end (adjacent the pin 84) and a relatively smaller vertical dimension at its free rear end; the surfaces 94 and 96 converging somewhat rearwardly to provide the wedge arm 92 with the necessary taper.

The top wedge arm surface 94 makes contact with the underside of the large roller 80 mounted on the upper end 82 of the upright 72, as best shown in Figs. 8 and 14.

The bottom wedge arm surface 96 rests on two small rollers 98 and 100. The roller 98 is mounted, slightly to the rear of the large roller 80, upon a pin 102 which extends horizontally and laterally inward from the adjoining carriage side plate 56. The roller 100 is mounted, somewhat to the front of the large roller 80, upon a shaft 104 which extends horizontally and laterally intermediate the two side plates 56, as indicated in Figs. 2 and 14. In other words, the top wedge arm surface 94 bears against the large roller 80 which is supported upon the base 52, while the bottom wedge arm surface 96 bears against rollers 98 and 100 supported upon the pivoted carriage 54.

When the shaft 86 is in its normal at rest position shown in Figs. 5 and 14, the handle 42 extends more or less straight up while the crank arm 88 extends more or less straight down; the wedge arm 92 being in its forwardmost position, with the relatively narrower rearward portions of the wedge arm interposed between the opposed rollers 80 and 98—100. However, as the handle 42 is swung downward and forward (clockwise in Figs. 5 and 14), the shaft 86 and crank arm 88 are turned correspondingly, to shift the wedge arm 92 longitudinally rearwardly to the position shown in Fig. 7. This shifts the forwardly diverging portions of the wedge arm surfaces 94 and 96 into position between the opposed rollers 80 and 98—100. Since, as pointed out above, the large upper roller 80 cannot move vertically relative to the base, the wedging action of the inclined or tapered surfaces 94 and 96 during rearward movement of the arm 92, necessarily forces the rollers 98 and 100 downward, thereby causing the carriage 54 (upon which the rollers 98 and 100 are mounted) to tilt downward (clockwise in Figs. 5 and 14) about its pivot pins 58, until the front end of the carriage reaches its lowermost printing and punching position shown in Fig. 7 and also shown in dash-dot lines in Fig. 4.

This downward movement of the carriage 54 causes compression of the springs 66 so that, when the handle 42 is released, the springs 66 act to shift the carriage upward and back to its original position of Figs. 5 and 14; the wedge arm 92, crank arm 88, shaft 86 and handle 42 all returning to their original positions so that the machine is reset and ready for the next carriage-depressing operation upon movement of the handle 42.

Figure 13:
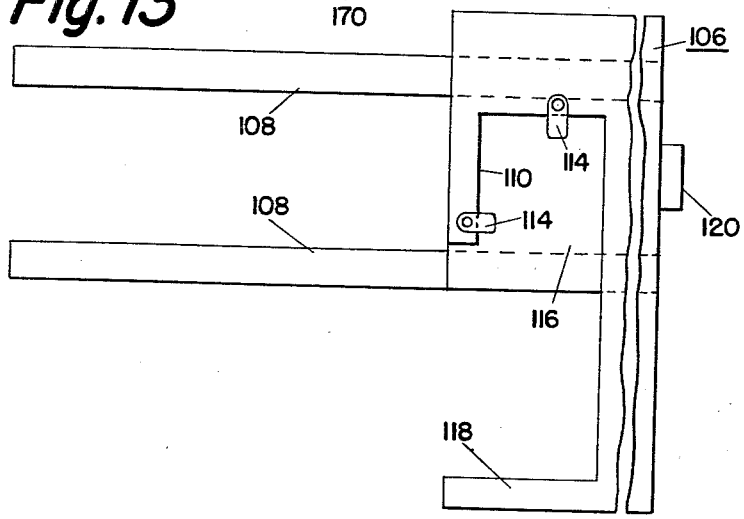
Figure 13 is a top plan view of the card carriage or slide as it appears when fully removed from the machine.

The card printing and clearing operation will now be described. A card-holding tray 106 is slidably mounted at the forward end of the base 52. The tray 106, which is separately shown in Fig. 13, includes a pair of longitudinal guides 108 which slide within correspondingly shaped notches or grooves in the base, and also includes a generally rectangularly transversely disposed recess 110 to receive a generally rectangular card or check 112 (the card being separately shown in Fig. 12). Adjacent one lateral edge of the card-receiving recess 110, the tray is provided with a pair of downwardly-acting spring clips 114, under which the edges of the card are adapted to be pushed, so as to hold the card substantially flush with the top surface of the tray. The right side of the recess 110 has a floor 116 to provide underlying support for the card during the stamping operation to be described. The left side of the recess 110 has no floor and is also open at its back edge to permit the card to be positioned beneath gang punches to be described. A rearwardly directed portion 118 at the left edge of the carriage provides peripheral support and guidance for the corresponding edge of the card. A pull handle 120 at the forward edge of the tray 106 permits the tray to be pulled out to expose the recess and permit insertion of the card thereinto, after which the tray can be pushed inward (rearward) to position the card beneath the horizontal and transverse run of the ribbon 46, as indicated in Fig. 4, in place for the printing operation to be described.

The machine is provided with automatic locking mechanism whereby it cannot be operated unless and until the tray has been fully inserted into its proper printing and punching relationship. This locking mechanism includes a locking lever 122 which is generally vertically disposed and is tiltably mounted laterally inward of the adjoining carriage side plate 56 by a central pivot pin 124, as best shown in Figs. 5, 7 and 14. A spring 126 is connected to the lower end of the locking lever 122 and urges said lever so that its rearwardly directed curved upper end 128 is yieldingly tensioned (counterclockwise in Figs. 5, 7 and 14) against a locking pin 130, to be hereinafter described so as normally to hold the locking pin (and the linkage mechanism, to be described, upon which the pin is mounted) against movement.

The lower portion of the locking lever 122 extends across the path of travel of one of the tray guides 108 and has a notch 132 formed in its front edge. If the tray 106 is not fully inserted, as shown in solid lines in Fig. 5, the end of the guide 108 is spaced from the lever 122 so that said lever remains in its normal spring-urged counterclockwise-rotated pin-engaging locking position. However, when the tray 106 is further inserted to its fully seated printing and punching position, the end edge of the guide 108 contacts the notch 132 and shifts the lever (clockwise in Figs. 5, 7 and 14) to the unlocking position shown in dash-dot lines in Fig. 5, wherein its curved upper end 128 is moved clear of the locking pin 130, so as to free the pin 130 (and the linkage mechanism with which it is associated) and to permit operation of the machine.

Withdrawal of the tray 106 (for example at the end of the printing and punching operation) results in spring-actuated counterclockwise rotation of the lever 122 back to the original pin-engaging locking position shown in solid lines in Fig. 5.

As best shown in Figs. 2, 3, 4 and 15, a plurality of elongated laterally spaced slides 134 are longitudinally movably mounted upon the carriage 54 more or less centrally intermediate the side plates 56. For purposes of illustration, four such slides are shown in the drawings. These, counting from right to left in Fig. 2, are constructed and arranged to actuate individual printing and punching means (to be described) in the units, tens, hundreds and thousands columns respectively or, in the case of a checkwriter, the cents, ten-cents, dollars, and ten-dollars columns respectively. It is to be understood however, that, in a commercial machine, there will be eight or ten or more of such slides 134 to permit the imprinting and punching of larger numbers or other data.

Each slide 134 has an elongated main portion 136 disposed horizontally at a level somewhat below the main shaft 86 and the bottom of the keyboard mechanism 34, as indicated in Figs. 2, 3 and 4. A roller 138 on a transverse shaft 140 provides underlying support for the forward end of the main portion 136, as shown in Figs. 4 and 15. A rack 142 is formed along the rear portion of the bottom edge of each slide 134; the rack 142 being engaged and supported by a pinion 144 carried by a transverse horizontal shaft 146. There is a separate shaft (and engaging pinion) for each slide 134; the shafts being longitudinally displaced from each other, as shown in Figs. 2 and 4. As best indicated in Fig. 2, the right hand end of each transverse shaft is journalled on the carriage side plate 56. The shafts 146 pass through holes in the opposite side plate 56 and extend transversely therebeyond and above a carriage rear extension 148; the opposite ends of the shafts being journalled on the upstanding side wall 150 of said extension, which is fastened to the outside of the left side plate 56 by bolts 152, as shown in Figs. 2, 3 and 9.

The upper edge 154 of the rear portion of each slide fits slidably within one of a plurality of laterally spaced longitudinal grooves in the bottom wall of the crosspiece 60, as shown in Figs. 3 and 4, so as to maintain each slide in vertical alignment with its pinion and other co-acting members, to be described.

Somewhat forward of the rack 142, a vertical portion 156 extends upward from each slide main portion 136. A coil spring 158 fastened to the rear transverse member 62 has its forward end connected to the slide vertical portion 156 and urges said slide rearwardly relative to the carriage. At the top of the vertical portion 156, there is mounted a generally horizontal longitudinal strip 160 carrying numerals "0" to "9" which become successively visible through cover window 36 upon movement of the slide 134.

Extending horizontally forwardly from the slide vertical portion 156, at a level somewhat below that of the strip 160, is a shorter upper portion 162 having a rack 164 formed along its lower edge. The rack 164 of each slide operatively engages one of a plurality of relatively large gears 166 mounted in laterally spaced relationship upon the main shaft 86 but journalled for rotation independently of said shaft and of each other. Fastened to each gear 166 is a generally downwardly directed printing quadrant 168 having a convex arcuate bottom edge or face 170 and eleven raised printing elements formed on said face 170. Of these printing elements, the frontmost element 169 is directly above the ribbon 46 when the slide 134 is in its forwardmost catch-engaged position shown in solid lines in Fig. 4. The element 169 is in the form of a star or other indicia to indicate that no number is intended to be imprinted when the slide is in its forwardmost catch-engaged position during operation of the machine, as will be described. The remaining elements 171 go from "0" to "9" successively.

The purpose of the "star" key 169 is to indicate that less than all of the slides 134 have been shifted rearwardly and less than the maximum number of digits are intended to be imprinted; thereby preventing re-imprinting and "raising" of checks or the like. For example, if a commercial machine has eight slides 134 and eight printing quadrants 168, and, accordingly, is capable of printing up to "$999,999.99," operation of the keyboard mechanism 34 (in the manner to be described) so as to release and move only seven of the slides 134 will result in the imprinting of the number "$*99,999.99." Similarly, operation of the keyboard mechanism 34 so as to release and move only six of the slides 134 will result in the imprinting of the number $**9,999.99."

Of course, the particular number brought into printing registration with the ribbon 46 depends on the extent of rotation (counterclockwise in Figs. 4 and 15) of each particular quadrant 168, which in turn is determined by the extent of rearward longitudinal movement of the corresponding slide 134.

Conversely, forward movement of each slide causes opposite (clockwise in Fig. 4) rotation of its gear 166 and printing quadrant 168, so that, when the slide is in its forwardmost position shown in solid lines in Fig. 4, the "star" printing key 169 is above the ribbon 46.

The mechanism for determining the extent of rearward movement of the several slides (and hence the nature of the printing keys 171 shifted to imprinting position) will now be described.

The 10-key keyboard mechanism 34 mentioned above is mounted at the front end of the carriage 54 and, as shown in Fig. 1, has ten keys zero to nine which can be depressed successively. The keyboard mechanism is of conventional construction and does not form part of the present invention. One conventional 10-key keyboard mechanism which can be employed is shown in Koca et al. Patent 1,943,828. Other such keyboard mechanisms are shown in Sundstrand Patents 1,198,487 and 1,583,102.

The keyboard mechanism 34 includes a longitudinal row of downwardly directed stop pins 172 which normally terminate slightly above the upper edge of the forward portion of the horizontal slide portion 136. There are ten pins 172 in each row, as shown in Fig. 4, the front pin corresponding to the zero key and the rearmost pin corresponding to the nine key of the mechanism 34. There are as many laterally spaced rows of pins 172 as there are slides 134. At the front end of each slide portion 136, there is an upwardly directed stop shoulder 174. This shoulder 174 is normally engaged by a pivoted catch 176 so as to maintain the slide in forwardmost position as shown in solid lines in Fig. 4. When the catch 176 is raised, it frees the slide to move rearward under the pull of its spring 158 to the point at which the shoulder strikes, and is halted by one of the pins 172 which has been extended downward by operation of the mechanism 34, as indicated in dash-dot lines in Fig. 4.

As mentioned above, the construction and operation of the 10-key keyboard are conventional and disclosed in prior patents so that they require no detailed explanation herein. It can be pointed out, however, that depression for example of the "2" key of the keyboard only and subsequent forward movement of the operating handle 42 results in downward extension of the third (from the right in Fig. 4) of the pins 172 in the first row. Thus, when the catch 176 is momentarily raised (through appropriate linkage mechanism, not shown) at a slightly later point during the forward movement of the handle 42, the first (righthand) slide 134 is released so as to move rearward (under the tension of its spring 158) until its upwardly directed stop shoulder 174 strikes, and is halted by, the downwardly extended third pin 172; thereby resulting in rotation of the first or righthand gear 166 and printing quadrant 168 to a degree sufficient to shift the numeral "2" on the first quadrant into printing position above the ribbon 46, whereby subsequent handle-actuated tilting of the carriage 54 results in the imprinting of the numeral "2" on the inserted card 110, in the units column (or, in the case of a check writer, in the cents column).

However, when depression of the "2" key is followed by depression of the "3" key before actuation of the handle 42, the conventional mechanism of the keyboard unit 34 results in downward extension of the third pin 172 in the second column and of the fourth pin in the first column. Thus, when the first and second slides 134 are released, they shift rearwardly into position to imprint the numeral "2" in the tens column and the numeral "3" in the units column, so that the card 110 is imprinted with the number "23" (or, in the case of a check writer, the amount $0.23).

Similarly, successive depression of the "2" key, the "3" key and the "4" key before actuation of the handle 42, results in shifting of three slides 134 and imprinting of the number "234" (or, in the case of a check writer, the amount $2.34).

Instead of the 10-key keyboard, it is possible to employ a conventional "full" keyboard, that is with keys from zero to nine inclusive in each column of the keyboard. In such case, each individual key is connected directly to the corresponding stop pin 172 (without the need for internal lateral transfer means in the keyboard mechanism) in a manner which is well known in the art and requires no showing herein.

Once the printing operation described above has been completed, it is necessary to reset the machine by returning all the rearwardly shifted slides to their original frontmost position, with each stop shoulder held by its catch 176. This operation and the mechanism for accomplishing it will now be described.

As best shown in Figs. 2, 4, 5, 7 and 14, a yoke 178 is pivotally mounted intermediate the carriage side plates 56. The yoke 178 includes generally vertical arms 180 pivotally connected to the adjoining side plates 56 near the upper edges of said plates 56 by pivot pins 182. A cross bar 184 extends laterally and horizontally intermediate the vertical arms 180 at a point somewhat above the lowermost free ends of said arms. Inwardly directed engaging pin 186 is mounted at the lowermost free end of one of the arms. The cross bar 184 is located to the rear of the slide vertical portions 156. During rearward movement of any of the slides 134, the vertical portion 156 contacts the cross bar 184 and rotates the yoke 178 (clockwise in Fig. 4) from the solid line position to the dash-dot line position of Fig. 4; the yoke being free to swing under the push of the spring-tensioned slide during the rearward number-setting movement of the slide. The extent of this rotation of the yoke is determined by the position of the vertical portion of the slide having the greatest rearward travel. The top wall of the cross piece 60 may be notched out adjacent its ends to provide the necessary clearance for the lower ends of the arms 180 during this slide-actuated rotation thereof.

As best shown in Fig. 5, the yoke 178 is constructed and arranged to be locked in forwardmost counterclockwise-rotated position through engagement of its pin 186 with a corresponding notch 188 formed in the lower edge of a generally horizontal lever arm 190 whose rearmost end is pivotally mounted, as at 192, to the adjoining right side plate 56 of the carriage 54; the arm 190 carrying the locking pin 130 mentioned above at a point slightly forward of its pivotally mounted end 192, and the notch 188 being disposed slightly rearward of the front end of said arm 190.

A connecting pin 194 pivotally connects the front end of the horizontal arm 190 to the lower end of a generally vertical link 196. Another connecting pin 198 pivotally connects the upper end of the link 196 to the rear end of a generally horizontal lever arm 200 which is located forward of and higher than the arm 190. A pivot pin 202, located intermediate the ends of the lever arm 200, tiltably fastens said arm 200 to the adjoining right side plate 56 of the carriage. The front end of the arm 200 pivotally connects, as at 204, with the bottom end of a release key 206 which, as shown in Figs. 1 and 2, is located at the right side of the keyboard unit 34. The key 206 is provided with a notch 208 which can co-act with a catch 210 pivotally mounted on the side plate 56 to lock the key in depressed position when the depressed key is manually shifted toward the front end of the machine; rearward manual shifting of the depressed key 206 freeing it from engagement with the catch. A spring 212 fastened for example to the pin 194 and anchored for example to the shaft 104 normally urges the lever arm and link assembly (190, 196 and 200) and the key 206 to the solid line position of Fig. 5, wherein the arm 190 is rotated (clockwise about its pivot 192) downward to permit engagement of the notch 188 with the pin 186; and wherein the arm 200 is rotated counterclockwise about its pivot pin 202; and wherein the key 206 is raised.

Obviously, with the lever arm assembly and the release key 206 in the solid line position of Fig. 5, the yoke is maintained in forwardmost position, which also maintains the individual slides in forwardmost position. The lever arm assembly is locked in this forwardmost position by interengagement of the locking lever 122 and the locking pin 130 on the arm 190 unless and until the card holding tray 106 is fully inserted, whereupon the locking lever 122 is rotated (to the clockwise rotated dash-dot line position of Fig. 5) to enable its curved upper end 122 to clear the pin 130, as described above, which clears the lever arm assembly for actuation by the release key 206. Depression of the release key 206 then shifts the lever arm assembly to the dash-dot line position of Fig. 5, which disengages the locking notch 188 from the pin 186 on the yoke arm 180, thereby freeing the yoke 178 for rearward pivotal movement under the pressure of the spring-tensioned slide or slides 134, as described; the slide 134 having been disengaged by lifting of the catch 176 and the extent of its rearward movement being determined by downward extension of one of the keyboard stop pins 172, as described above.

The forward return movement of the yoke 178 for resetting the slides in their forwardmost position following the handle-actuated printing operation (described above) and punching operation (to be described) will now be described.

This forward return movement is actuated by the return movement (counterclockwise in Fig. 7) of the operating handle 42 from its forward position of Fig. 7 to its normal generally upright position of Fig. 5 and is best illustrated in Figs. 5, 6, 7 and 14. Pivotally connected to the lower end of the crank arm 88 on the main shaft 86, for example by the pin 90 described above which can be made to extend through to the inner side of the crank arm, is the front end of the forwardmost generally horizontal portion 214 of a more or less Z-shaped slide 216, shown in Figs. 5, 6, 7 and 14.

The yoke-returning slide 216 has an intermediate generally vertical portion 218, at the upper end of which is integrally formed a generally horizontal rearwardly directed portion 220. The lower edge 222 of the upper rearwardmost horizontal portion 220 is provided with a pin-engaging notch 224 adjacent its forward end. In the normal generally upright position of the operating handle 42, the notch 224 is maintained forward and somewhat elevated from a generally horizontal laterally outwardly directed pin 226 provided on the yoke arm 180 somewhat below the uppermost arm pivot pin 182 but above the yoke cross bar 184, as shown in solid lines in Fig. 6. At the rear end of the slide portion 220, there is provided a downwardly directed bearing edge 228 disposed parallel to, but at a slightly lower level than the main lower edge 222 and connected therewith by an inclined camming edge 229.

In the normal solid-line position of Fig. 6, the bearing edge 228 is shown as resting on a roller 230 mounted on a shaft 232 extending generally horizontally and laterally inward from the adjoining carriage side plate 56. A relatively large retaining washer 234 is mounted at the innermost free end of the shaft 232 more or less adjoining the laterally inner wall of the rearmost free end of the upper slide portion 220 to maintain the bearing edge 228 in vertical alignment with the roller 230. A coil spring 236 is wrapped over the upper edge of the slide portion 220 and has its ends fastened for example to the transverse member 62 and serves to exert resilient downward pressure on the rearmost free end of the slide portion 220, so as normally to maintain the bearing edge 228 in contact with the roller 230 and also to maintain the unnotched portion of the main lower edge 222 in contact with the pin 226, as indicated in solid lines in Fig. 6. It might be pointed out that, in the schematic perspective view of Fig. 14, the transverse dimension of various of the parts is exaggerated for greater clarity; a more accurate indication of the lateral closeness of the several elements being apparent from the top plan view of Fig. 2.

When the upwardly extending operating handle 42 is pulled forward (clockwise in Fig. 5), the main shaft 86 is rotated (clockwise in Fig. 5 and counterclockwise in Fig. 6) to swing the downwardly extending crank arm 88 arcuately rearwardly (counterclockwise in Fig. 6) and to shift the slide 216 to the rearmost position shown in dash-dot lines in Fig. 6. During the initial portion of this rearward movement of the slide 216, the bearing edge 228 rides on the roller 230 and maintains the main lower edge 222 in elevated position to permit the notch 224 to pass over, and to the rear of, the yoke arm pin 226.

When the operating handle 42 is returned to its original upright position, the slide 216 is first moved forward (its lower edge 222 bearing against the pin 226) until the notch 224 drops onto and engages the pin 226 as indicated in the intermediate dash-dot line position of Fig. 6. It should be noted that the yoke 178 has, in the meantime, been swung rearwardly (to the counterclockwise rotated dash-dot line position of Fig. 6) due to the push of the released spring-tensioned slides 134, as described above. Subsequent forward movement of the slide 216 carries the yoke 178 with it (due to the interengagement of the notch 224 and pin 226) and, in so doing, causes the yoke cross bar 184 to return the slides 134 to their forwardmost catch-engaged position, as described above. In this connection, it is pointed out that the front stop shoulder 174 of each slide is provided with a forwardly directed camming edge 238 which momentarily contacts and raises the pivoted catch 176 during the terminal portion of this forward slide movement and then allows the catch to drop behind the slide shoulder 174 in retaining engagement therewith.

At the point where the slides 134 have been fully moved forwardly and engaged by their catches 176, the slide camming edge 229 contacts the roller 230 and enables the bearing edge 228 to ride up onto the roller 230. This raises the main lower edge 222 sufficiently to permit the notch 224 to clear the upper pin 226 and, in so doing, frees the yoke for the rearward movement initiated by the next operation of the handle 42; the elements having then been returned to the solid-line position of Fig. 6.

When the yoke 178 is thus shifted to its forwardmost position by operation of the Z-shaped slide 216, as described above, it is in location to be engaged and held by the lever arm 190; the locking notch 188 of said arm 190 falling over the lower yoke arm pin 186 (because of the tension of the spring 212) as shown in solid lines in Fig. 5 and as described above. However, when the depressed release key 206 is locked down (by tilting it forward so that its notch 208 is engaged by the catch 210 as described above), the lever arm 190 is maintained in elevated non-engaging position and, at the same time, the keyboard mechanism 34 is prevented (by means of conventional linkage, not shown) from clearing itself of the numbers or other data previously fed to it for control of the stop pins 172. Thus, when the release key 206 is locked down, return of the handle 42 does not clear the keyboard mechanism or engage the catches 176 and, instead, maintains the machine in condition for repetitive imprinting of the same number or other data, as many times as the handle 42 is operated with the release key 206 locked down. When the release key 206 is disengaged from its catch 210 (by tilting it rearwardly sufficiently to disengage the notch 208 from the catch), operation of the machine is as described above, that is, completion of the cycle and return of the handle 42 to its normal upright position, returns and locks the yoke 178 and the slides 134 in their forwardmost positions and clears the machine, so that it will not print until one or more numeral keys of the keyboard mechanism 34 have been depressed to supply the necessary data and to control the stop pins 172 (after which a forward pull on the handle 42 will initiate a new cycle of printing and a return movement of the handle 42 will clear the keyboard mechanism and return and re-lock the yoke 178 and slides 134 in their forwardmost positions).

The mechanism for simultaneously punching the card 112 with perforations corresponding to the variable data imprinted thereon will now be described. It has been pointed out hereinabove that the bottom rear edge of the main horizontal slide portion 136 is provided with a rack 142, and that the rack 142 of each slide is operatively engaged with a pinion 144 mounted on a transverse shaft 146 (there being as many longitudinally displaced shafts 146 and pinions 144 as there are slides 134), and that, as best shown in Figs. 2 and 9, the left hand ends of the several transverse shafts 146 are mounted on the upstanding side wall 150 of an extension member 148 which is secured to the outside of the left side plate 56 of the carriage 54 adjacent the rear edge of the carriage side plate.

To the outside of the left side plate 56, there is also secured, for example by one or more braces 240, another carriage extension member 242 which is disposed nearer the forward edge of the side plate. The front carriage extension member 242 is of hollow open-ended generally rectangular cross-sectional configuration, with a top wall 244 (to which the braces 240 may be bolted) and a bottom wall 246; the vertical clearance between the walls 244 and 246 providing snug support for a plurality of gang punch actuating generally horizontal longitudinally-extending laterally-spaced slides 248, to be more fully described, which enter the member 242 from the rear open end thereof; there being one slide 248 for each slide 134 described above. Each slide 248 has a downwardly directed foot portion 250 which rests on, and slides along the bottom wall 246.

Longitudinally slidably mounted upon the rear extension member 148 are a plurality (for example four) of laterally spaced racks 252 which are operatively engaged with the undersides of pinions 254 mounted near the left hand ends of the transverse shafts 146 described above.

The pinions 254 of the several shafts 146 are transversely or laterally spaced relative to each other and are in vertical alignment with their respective racks, to which they are connected. The slides 248 are in longitudinal alignment with, but at a somewhat higher level than, the racks 252; the rear end of each slide being attached to its rack by a generally upright connecting member 255.

Since the racks 252 are interconnected with the racks 142 of the slides 134 (through the engaging pinions 254 and 144 and the shaft 140), and since the racks 142 engage the tops of the pinions 144 while the racks 252 engage the bottoms of the pinions 254, and since the pinions 254 and 144 have the same diameter, it follows that the racks 252 and slides 248 move longitudinally responsive to movement of the slides 134, to the same extent as, but in an opposite longitudinal direction to, said slides 134. That is, if the slides 134, when released, move longitudinally rearwardly (under the pull of their springs 158), the corresponding racks 252 and slides 248 move longitudinally forwardly to the same extent from their rearmost position shown in solid lines in Fig. 9. Conversely, when the slides 134 are swept longitudinally forwardly to their frontmost catch-engaged position shown in solid lines in Fig. 4, by the push of the yoke 178, the racks 252 and slides 248 are correspondingly moved backwardly to their rearmost position shown in solid lines in Fig. 9 by reason of the interconnection afforded by the engaging pinions 254 and 144 and shaft 146.

The bottom wall 246 of the member 242 is provided with a plurality of laterally-spaced rows of ten longitudinally spaced holes 256, each row being in vertical alignment with the path of travel of one of the slide foot portions 250; the foot portions being larger than the holes 256 so that they can pass freely thereacross without dropping into or engaging with said holes, as the slides 248 move longitudinally within the member 242.

The base 52 of the machine is provided with an extension 258 on the left side, and nearer the forward end, thereof; the top horizontal wall 260 of said base extension being somewhat below the bottom wall 246 of the forward carriage extension 242. Slightly below the top wall 260 is another horizontal member or plate 262. The wall 260 and plate 262 are both provided with vertically aligned holes arranged in laterally spaced rows, with each row containing ten longitudinally spaced holes, which are in vertical alignment with, but slightly smaller than, the holes 256 in the carriage extension wall 246 mentioned above. Supported by the wall 260 and plate 262 is a gang punch indicated generally by the reference numeral 264. The gang punch 264 includes laterally spaced longitudinal rows of individual punches 266 vertically movably mounted within the holes in the wall 260 and plate 262, with the ends of the punches 266 protruding vertically upward beyond the wall 260 and downward beyond the plate 262, as shown in the sectioned portion of Fig. 9. Fitted about each punch 266 and disposed intermediate the wall 260 and plate 262 is a helical compression spring 268 which is conventionally attached to the punch so as to urge it upwardly and normally to maintain each punch in the uppermost position shown in solid lines in Fig. 9.

In this last-mentioned uppermost position of the punches 266, their upper ends extend into, but not upward beyond, the holes 256. As indicated in Fig. 9, the holes 256 are appreciably oversize relative to the punches 266 so as not to interfere with the slight horizontal displacement of the extension 242 during pivotal movement of the carriage 54 relative to the base 52.

Mounted within the base extension 258, at a level below the gang punch 264, is a die 270 having holes 272 corresponding in number and size to, and in vertical alignment with, the individual punches 266; the lower protruding ends of the punches 266 terminating somewhat above the die 270 when the punches are in their normal uppermost position, shown in Fig. 9. When the tray 106 is fully inserted, that portion of the card 112 which is contained within the floorless portion of the recess 110 passes above the die 270, so that the card is interposed vertically intermediate the die holes 272 and the lower protruding ends of the elevated punches 266, as indicated in Fig. 9.

When the slides 248 are in their rearmost position shown in solid lines in Fig. 9 (corresponding to the frontmost catch-engaged position of the slides 134), the foot portions 250 are rearward of the holes 256, so that the holes 256 are uncovered. Thus, when the carriage 54 is moved downward (clockwise in Fig. 9) relative to the base 52, the carriage extension member 242 is free to move downward without disturbing or shifting the punches 266 from their normal spring-tensioned uppermost position; the movement of the member 242 relative to the punches resulting in the upper ends of the punches extending upward beyond the holes 256 which, as mentioned above, are somewhat oversize relative to the punches 266 so as not to interfere with the slight lateral displacement of the member 242 due to the arcuate pivotal travel of the carriage 54 about the pivot pins 58. In other words, depression of the carriage 54 with any slide 134 in its frontmost catch-engaged position will cause all of the punches in the corresponding row of the gang punch 264 to remain inoperative.

However, when any one of the slides 134 is released and moves rearward (under the pull of its spring 158) until it is halted by one of the stop pins 172, this rearward movement causes corresponding forward movement of the slide 248 to which it is connected, in the manner indicated in Fig. 15, to a position in which the foot portion 250 covers one of the holes 256, as indicated in broken lines in Fig. 9. With the hole 256 thus covered, it is apparent that downward movement of the carriage 54 and extension member 242, necessarily forces the corresponding punch 266 downward (against the pressure of its spring 268) until the lower end of the punch 266 pierces the card 112 before entering the corresponding die hole 272, as indicated in broken lines in Fig. 9. In Fig. 9, the rearmost punch 266 of each row corresponds to the "0" printing positions of the slide 134 and quadrant 168, while the frontmost punch 266 corresponds to the "9" printing positions of the slide 134 and quadrant 168.

It is apparent, therefore, that the extent of rearward movement of the several slides 134 not only determines the numbers imprinted on the card 112 when the handle 42 is operated to depress the carriage 54, but also determines the spacing of the holes punched in the card relative to the leading edge (upper edge in Fig. 12) of said card 112. The number and location of the holes punched in the card 112 enable large numbers of such punched cards to be handled quickly and easily in conventional automatic machines which are capable of classifying and sorting the cards, interpreting the data represented by the holes, etc., in a manner well known in the art. So-called "I.B.M." machines manufactured by International Business Machines Corp. are illustrative of such automatic machines, although various other types are available and can be used.

I prefer to provide my novel machine with means for also punching the card with predetermined non-variable or fixed data, as distinguished from the variable numbers or other data fed to it by the keyboard mechanism 34. Such non-variable data may, for example, be the identification number of an employee to be punched into his paycheck.

To this end, I mount a gang punch 274 within the base extension 258 generally alongside of, and laterally outward of, the gang punch 264 described above. The gang punch 274 generally resembles the gang punch 264, being supported by the wall 260 and plate 262, and including laterally spaced longitudinal rows of individual punches 276 and springs 278 (like the punches 266 and springs 268). In their normal spring-tensioned uppermost position, the punches have their upper ends extending into, but not upward beyond, holes 280 correspondingly placed in the bottom wall 246 of the carriage extension member 242. As in the case of the holes 256, the holes 280 are somewhat oversize relative to the punches 276 to permit the slight horizontal displacement of the member 242 relative to the punches 276 during pivotal movement of the carriage 54. The construction of the gang punch 274 is best shown in Figs. 2, 10 and 15.

Mounted within the base extension 258, below the gang punch 274, is a die 282 having holes 284, into which the lower ends of the punches 276 extend when the punches are forced downward, as in the case of the die 270 described above. As indicated in Fig. 10, the card 112 is disposed intermediate the punches 276 and the die 282 when the tray 106 is inserted, so that such downward movement of the punches 276 pierces holes or perforations 286 in the card 112 to the left (Fig. 12) of the holes of perforations 288 formed in said card by the gang punch 264.

The operation of the gang punch 274 is regulated by a key 290 of thin flat sheet metal or the like separately shown in Fig. 11 having downwardly directed dimples or projections 292 stamped therein; the number and location of the projections 292 determining the data punched into the card 112 by the gang punch 274 during pivotal downward movement of the carriage 54. In the embodiment illustrated, the gang punch 274 has four rows of punches 276, with ten punches (corresponding to the numerals "0" to "9" from left to right in Fig. 10) in each row. The key 290 illustrated has four projections 292 (one for each row of punches 276) so located that, when the key 290 is inserted, through a horizontal front slot 294 (Fig. 1) in the cover or housing 32, within the carriage extension member 242, said projections 292 will overlie and cover four of the holes 280. Covering of these four holes 280 will cause the corresponding punches 276 to be forced downward (against spring pressure) when the carriage 54 is moved pivotally downward, in a manner similar to the action of the slide foot portions 250 described above. In Figs. 2, 10 and 11, the projections are so placed as to cause punching of holes 286 in the card 112 corresponding to the number "4619," although, of course, any other number could be punched by appropriate placing of the projections 292.

Of course, the punches 276 whose holes 280 are not covered by projections 292 are not forced downward with the carriage 54 and instead are maintained in their normal uppermost position by their springs 278; the upper ends of these punches 276 then extending upward slightly beyond the depressed bottom wall 246, in a manner similar to that described above in connection with the operation of the punches 266.

The operation of the embodiment of Figs. 1–15 is as follows. The key 290 of Fig. 11 is inserted, through cover slot 294, into operative relationship with gang punch 274 and die 282, as indicated in Figs. 2 and 10. The tray 106 is pulled forward to expose its card-holding recess 110 and the card 112 is inserted within said recess, after which the tray 106 is pushed rearward as far as it will go, so as to position the card 112 in stamping relationship to the printing quadrants 168 and in perforating relationship to the gang punches 264 and 274 and the dies 270 and 282, and so as to shift the locking lever 122 to disengaging position, as indicated in broken lines in Fig. 5. With the operating handle 42 in the upright position of Figs. 2, 4 and 5, the machine is now ready to begin the cycle of simultaneous printing-and-punching and subsequent clearance.

The desired numbers, or other variable data, are then fed to the keyboard mechanism 34 by sequential depression of the desired number keys "0" to "9," after which the release key 206 is pushed down.

Pushing down of the release key 206 shifts the lever arm assembly from the solid line position of Fig. 5 to the interrupted or broken line position, thereby freeing the yoke arm pin 186 from the locking notch 188 and enabling the yoke 178 to move pivotally rearward under the pressure of the spring-tensioned slide or slides 134. Pushing down of the key 206 also causes raising of one or more of the catches 176, thereby releasing the slides 134 for spring-actuated rearward movement from their frontmost engaged solid line position of Fig. 4. The number of slides released depends on the number of keys sequentially depressed on the keyboard mechanism 34 and the extent of rearward movement of the released slides 134 depends on which of the stop pins 172 protrude downward which in turn depends on which of the keyboard keys have been depressed, as described hereinabove.

This rearward shifting of one or more of the slides 134 not only shifts the yoke 178 rearwardly but also rotates the gear 166 to turn the printing quadrant 168 to appropriate position and, at the same time, rotates the transverse shafts 146 so as forwardly to shift the racks 252 and slides 248 to appropriate positions, wherein one or more holes for corresponding gang punches 266 are covered by slide foot portions 250.

When operating handle 42 is now manually shifted from its normal upright position to the forwardly inclined position of Fig. 7, the shaft 86 and crank arm 88 are turned to shift the wedge arm 92 rearwardly and thereby to move its forwardly diverging surfaces 94 and 96 into position between opposed rollers 80 and 98—100, causing downward movement of the rollers 98 and 100 (as indicated by the arrows in Fig. 8). This causes the carriage 54 to tilt downward about its pivot pins 58 in the manner described above, so as to bring the printing quadrants 168 into contact with the card 112 and also to cause punching or perforation of the card 112 by the gang punches 264 and 274.

When the handle 42 is released, the compressed springs act to return the carriage to its uppermost position of Figs. 5 and 14; the wedge arm 92, crank arm 88, shaft 86 and handle all returning to their original positions. Assuming that the release key 206 has not been locked down, this return movement of the crank arm 88 also operates automatically to return the slides 134 to their forwardmost position and to re-engage them with their catches 176. Thus, the slide 216 (which had been shifted to the rearmost broken-line position of Fig. 6 during the forward tilting of the handle 42) is moved forward until the notch 224 engages the pin 226 and subsequently shifts the yoke 178 and slides 134 forwardly.

At the end of this forward movement, the slide camming edge 229 operates to raise the edge 222 until the notch 224 clears the upper yoke pin 226, after which the locking notch 188 of the spring-tensioned arm 190 is brought down into locking engagement with the lower yoke pin 186 which holds the yoke 178 and the slides 134 in forwardmost position so that the slides can be re-engaged by their catches 176 to lock them in their forwardmost position. This pin-engaging downward movement of the arm 190 results in upward return movement of the release key 206 and, through conventional linkage mechanism, causes clearing of the keyboard mechanism 34, so that the machine is re-set and ready for the next cycle of printing-and-punching.

However, when the release key 206 has been locked down (by engagement of its notch 208 with the pivoted catch 210), the arm 190 is maintained in elevated position, preventing engagement of the notch 188 with the pin 186, and clearing of the keyboard mechanism 34 is prevented. Thus, the mechanism 34 is maintained at its original setting and the slides 134 are free to move rearwardly to the same positions (determined by the protruding stop pins 172) in advance of the next operation of the handle 42. In other words, with the release key 206 locked down, the machine is set up for "repeat" operation, which means that the same information is printed and punched with each operation of the handle 42.

Manual unlocking of the release key 206 at the end of any cycle, terminates the "repeat" operation and causes locking of the yoke 178 and slides 134 in their forwardmost positions and clearing of the keyboard mechanism 34, so that new variable information can be fed to the keyboard mechanism in the manner described above.

Figure 16:
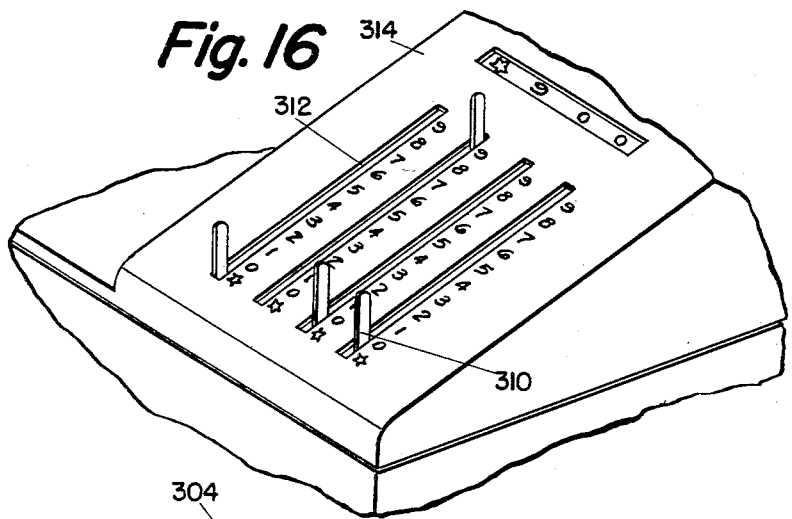
Figure 16 is a fragmentary perspective view of a lever or rod actuated printing and punching machine constituting another embodiment of this invention.
Figure 17:
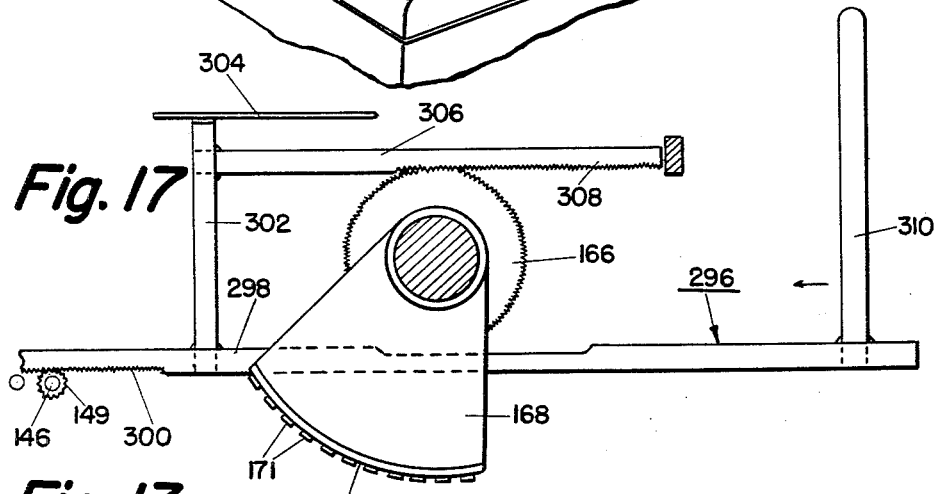
Figure 17 is a fragmentary longitudinal sectional view of the embodiment of Fig. 16, generally corresponding to the view of Fig. 4, showing one of the lever or rod carrying slides which actuates the printing quadrant and also transmits actuating motion to the punching mechanism (not shown).

In Figs. 16 and 17, there is shown a modified embodiment of the present invention, wherein the automatic keyboard mechanism 34 is eliminated and manually-positioned slides 296 are used in place of the slides 134 of the embodiment of Figs. 1–15.

The slides 296 generally resemble the slides 134 in that they have a lower horizontal main portion 298; a rack 300 at the bottom rear edge of said horizontal portion 298; a vertical portion 302 extending upward from the horizontal portion 298 forward of the rack 300; a horizontal numeral-bearing strip 304 at the top of the vertical portion 302; an upper horizontal portion 306 extending forwardly from said vertical portion 302 somewhat below the upper end thereof; and a rack 308 formed along the lower edge of the upper horizontal portion 306. The rack 308 is operatively engaged with the gear 166 on the main shaft 86, as shown in Fig. 17, in the manner hereinabove described, so that longitudinal movement of the slide 296 will cause rotation of the gear 166 and the printing quadrant 168. The bottom rack 300 engages pinion 144 so that longitudinal movement of the slide 296 also causes rotation of the transverse shaft 146 and opposite longitudinal movement of the rack 252 and the punch-controlling slide 248 in the same manner described in connection with the embodiment of Figs. 1–15.

However, the slide 296 differs from the slide 134, in that it no longer has any spring or upwardly-directed front stop shoulder (there being no keyboard or stop pins 172 in this embodiment). Instead, the slide 296 is provided with a vertical handle portion 310 which extends upward from a point adjacent the front end of the main horizontal portion 298, and which, as indicated in Fig. 16, is sufficiently long so that its upper end protrudes upward through a longitudinal slot 312 formed in the top wall of the cover or housing 314; there being as many slots 312 as there are laterally disposed slides 296.

From front to rear alongside each slot 312, there are provided markings beginning with a "star" or the like and continuing successively with the numerals "0" to "9"; these markings corresponding to the raised printing elements 169 and 171 on the lower convex edge 170 of the printing quadrant 168. The "star" location is the frontmost position of the slide 296 and handle portion 310, while the "9" location represents the rearmost position. In Fig. 16, there are shown four slides, the first (leftmost) slide being at its frontmost or "star" position; the next at the "9" position; and the last two at the "0" positions, so that, when operated, the machine would imprint the sum "$*9.00." At the same time, the gang punch 264 would form holes or perforations corresponding to this data, in the manner described hereinabove, and the gang punch 274 would form holes or perforations determined by the fixed data fed to it by the key 290, as described hereinabove.

In this embodiment, the rearward movement of the slides 296 is accomplished by manual setting of the protruding upper ends of the handle portions 310. If desired, conventional "click stop" mechanism (not shown) can be provided for the handle portions to ensure correct lining up of the slides and the printing quadrant elements 171.

This embodiment may be provided with a yoke 178 and associated elements for automatically returning the slides 296 to their frontmost position, although it is also possible, in the interest of economy, to eliminate this feature and, instead, to utilize manual re-setting.

The mechanism for causing imprinting and perforating depression of the pivotally mounted carriage 54 relative to the base 52, upon operation of the handle 42, includes the wedge arm 92 and associated parts, as discussed above in connection with the embodiment of Figs. 1–15.

The present invention contemplates modifications which will be apparent to those skilled in the art. Thus, for example, the manually operated handle 42 could be replaced by motor-driven actuating means of conventional construction.

In addition to imprinting the numbers or other variable data, the carriage 54 could be provided with conventional mechanism, known in the art, for imprinting the date, the check signature, the user's name and address, and/or other fixed data each time the carriage is depressed. All imprinting may be accompanied by partial maceration of the check or card to prevent subsequent alteration; this again be conventional in the art.

In view of the fact that this invention may be embodied in other specific forms without departing from its essential attributes, the foregoing embodiments are to be considered in all respects merely as illustrative and not restrictive; reference being made to the appended claims as indicating the scope of the invention.

Having thus described my invention, I claim as new and desire to protect by Letters Patent the following:

1. A printing and perforating machine comprising a plurality of type-carrying members, each being independently movable into selected printing position; perforating mechanism having a plurality of spaced rows of individual perforating punches, each punch being independently movable into perforating position; selector mechanism operatively connected to the type-carrying members and the perforating mechanism for setting said members and said perforating mechanism responsive to variable data fed to the machine; said selector mechanism including a plurality of slides, each operatively connected to a separate type-carrying member, a second plurality of slides, each operatively associated with a separate row of perforating punches, and means operatively interconnecting each of said first plurality of slides with a separate one of the second plurality of slides so that each interconnecting pair of slides moves together, said first plurality of slides being spring-tensioned for longitudinal movement in one direction, releasable catch means for separately holding each of said first plurality of slides when shifted in the other direction against the spring-tension, means for releasing one or more of said catch means, a stop shoulder formed on each of said first plurality of slides; keyboard mechanism for receiving the variable data, said keyboard mechanism including a plurality of laterally-spaced longitudinal rows of selectively extensible stop-pins, there being one row for each of the first plurality of slides; any extending stop-pin coacting with the slide stop shoulder to halt the spring-acted movement of the released slide at a predetermined point determined by the nature of the variable data fed to the keyboard mechanism; an actuating means for simultaneously causing imprinting movement of the pre-selected type-carrying members and perforating movement of the preselected perforating punches.

2. A construction according to claim 1 wherein the keyboard mechanism includes a ten-key keyboard and means whereby successive depression of keys causes progressive transfer from right to left of the data fed to the mechanism by preceding depression of keys and causes corresponding transfer of the pre-selected stop pin extension control from one row of stop pins to the next left row.

3. A construction according to claim 1 wherein the first plurality of slides are provided with re-setting means for automatically returning all of the released spring-shifted slides to their original catch-engaged position at the termination of the imprinting and perforating operation and clearing the keyboard for the next operation.

4. A construction according to claim 3 wherein the re-setting means includes a pivotally mounted yoke or the like having a cross-piece constructed and arranged to contact and return all of the spring-shifted slides to their original catch-engaged position; means for actuating said yoke at the termination of the imprinting and perforating movement; and means including a release key associated with the keyboard mechanism for locking said yoke at the end of its slide-returning movement and for subsequently releasing said yoke prior to the next imprinting and punching movement.

5. A construction according to claim 4 wherein the machine includes a movable tray member for holding a card or the like which is to be imprinted and perforated, said tray being shiftable in one direction to receive the card and in the other direction to transfer the card into imprinting and perforating position; and wherein the yoke releasing mechanism is provided with locking means preventing release of the yoke; and wherein means are provided for releasing said locking means only when the tray is shifted to the imprinting and perforating position of the card.

6. A construction according to claim 4 wherein the yoke key is provided with means for releasably holding it in depressed position, thereby preventing locking of the yoke at the end of its slide-returning movement so that the machine is set up for repeat operation with the data originally fed to the keyboard mechanism.

7. A construction according to claim 4 wherein the machine includes a main shaft having a crank arm mounted thereon and constructed and arranged to be reciprocally rotated so as to effect the imprinting and perforating movement; and wherein the yoke actuating means includes a pin on said yoke; a slide member having a notch constructed and arranged releasably to engage said pin, one end of said slide member being pivotally connected to said crank arm for movement therewith; a supporting roller for the other end of the slide member, said other end having a pair of generally parallel but displaced bearing edges and an interconnecting camming edge, the notch being formed on the inner bearing edge and being capable of engaging said yoke pin only when the inner bearing edge is in contact with the supporting roller; return movement of the shaft and crank arm causing movement of the slide member and also causing movement of the yoke until the camming edge contacts the roller and shifts the notch clear of the pin thereby disengaging the yoke from the slide member and enabling the slide member to continue moving independently of the yoke while the outer bearing edge rests on the roller and also enabling the slide member to move in the opposite direction free of the yoke preliminary to the next yoke actuating operation.

8. A construction according to claim 7 wherein the means for locking the slide at the end of its slide-returning movement includes a second pin mounted on the yoke, and a pivotally-mounted lever arm operatively connected to the release key, said lever arm being normally urged toward said second pin and having an engaging notch for said pin, said second yoke pin and said lever arm notch being so constructed and arranged that the notch will engage and hold the yoke automatically when the yoke reaches the end of its slide-returning movement; depression of the release key causing pivotation of the lever arm so as to disengage the lever arm notch from the second yoke pin and thereby free the yoke for movement with the spring-tensioned slides.

9. A construction according to claim 8 wherein the actuating means for the imprinting and perforating includes a wedge arm pivotally connected at one end to the crank arm and having opposed tapered bearing edges adjacent its other end; a fixedly mounted roller upon which one of said tapered bearing edges rides; a pivotally mounted carriage having a pair of spaced rollers upon which the other of said tapered bearing edges rides; spring means normally urging said carriage to elevated position; operation of the main shaft and crank arm causing longitudinal movement of the wedge arm whereby the camming action of the opposed tapered bearing edges causes downward shifting of the carriage-mounted rollers so as to produce downward imprinting and perforating tilting of the pivoted carriage.

10. In a printing and perforating machine, a base; a carriage having its rear end pivotally mounted on said base; spring means urging said carriage upward so that its front end is normally somewhat elevated relative to the base; a plurality of type-carrying members mounted on said carriage, each being independently movable into selected printing position; gang-punch perforating mechanism mounted on said base and including a plurality of spaced rows of individual generally vertically disposed punches each being independently movable downward into perforating position from its normal uppermost position; card-holding means mounted on said base and being shiftable to a position for receiving a card or the like and to another position for locating the card in operative juxtaposition to the type-carrying members as well as the gang-punch mechanism; selector mechanism operatively connected to the type-carrying members as well as the gang-punch mechanism for receiving and transmitting variable data so as selectively to position one or more of the type-carrying members and correspondingly to lock one of the individual punches in one or more of the rows for downward movement with the carriage; and actuating means including a reciprocally rotatable operating shaft and a crank arm mounted on the shaft for forcing the front end of the carriage downward toward the base and thereby causing the pre-shifted type-carrying members and the pre-locked punches to be forced downward against the card so as to imprint and perforate the card simultaneously with the variable data fed to the machine.

11. A construction according to claim 10 wherein a second gang-punch perforating mechanism, also having a plurality of spaced rows of individual generally vertically disposed independently movable punches, is mounted on the base adjacent the first gang-punch perforating mechanism; and wherein a removably insertable control key is constructed and arranged to be positioned in operative relationship with the second gang-punch mechanism, said control key being arranged to feed fixed data to the second gang-punch mechanism by selectively interlocking one of the individual punches in one or more of the rows of the second gang-punch mechanism for downward movement with the carriage, whereby downward movement of the carriage will cause simultaneous perforation of the card with both the variable data and the fixed data.

12. A construction according to claim 11 wherein the two gang-punch mechanisms are disposed in laterally-spaced relationship to each other, the rows of individual punches being longitudinally disposed and laterally spaced, and wherein the type-carrying members are generally longitudinally disposed and laterally spaced relative to each other and also to the gang-punch mechanisms, and wherein the selector mechanism includes a plurality of carriage-mounted transverse shafts and rack-and-pinion means associated with said shafts and operatively connected to the type-carrying members and also the first gang-punch mechanism.

13. A construction according to claim 10 wherein the selector mechanism includes a plurality of laterally spaced longitudinally disposed slides mounted on the carriage and individually reciprocally movable longitudinally with respect to the carriage; means operatively connecting each of said slides to a separate movable type-carrying member so that movement of the slide causes movement of its interconnected type-carrying member; a second plurality of laterally spaced longitudinally disposed slides mounted on the carriage and individually reciprocally movable longitudinally with respect to the carriage; each of said second plurality of slides being constructed and arranged to extend above and parallel to a separate row of punches of the gang-punch mechanism; means carried by each of said second plurality of slides and operatively associated with the corresponding row of punches whereby movement of any one of said slides will selectively lock a different one of the punches in its row for downward movement with the carriage; and means for independently connecting each one of the first plurality of slides to a separate one of the second plurality of slides for longitudinal movement therewith.

14. A construction according to claim 13 wherein the selector mechanism also includes an exposed manually shiftable handle carried by each of the first plurality of slides whereby each pair of interconnected slides can be simultaneously set according to the variable data manually fed thereto.

15. A construction according to claim 14 wherein the interconnecting means includes a rack associated with each slide; a carriage-mounted transverse shaft for each pair of slides; and a pair of connected rotatable pinions mounted on each slide shaft and operatively engaged with the corresponding racks; the racks, shafts and pinions being located adjacent the rear end of the carriage and being constructed and arranged so that rearward movement of the first plurality of slides causes forward movement of the second plurality of slides, and vice versa.

16. A construction according to claim 13 wherein the interconnecting means includes a rack associated with each slide; a carriage-mounted transverse shaft for each pair of slides; and a pair of connected rotatable pinions mounted on each shaft and operatively connected with the racks of the corresponding pair of slides.

17. A construction according to claim 16 wherein the racks and pinions are constructed and arranged to cause opposite longitudinal movement of the two slides of each interconnected pair.

18. A construction according to claim 16 wherein each of the first plurality of slides is provided with separate spring means urging the slide rearwardly with respect to the carriage; and wherein each of said first plurality of slides is provided with a stop-shoulder and with separate catch means for releasably locking it in forwardmost position; and wherein the selector mechanism also includes keyboard mechanism having a plurality of laterally spaced longitudinal rows of selectively extensible individual stop-pins, there being one row of stop-pins for each slide, any of the stop-pins when extended cooperating with the stop-shoulder to halt the rearward spring-urged movement of the slide, the variable data fed to the keyboard mechanism determining which of the stop-pins in any given row is extended into position to engage the slide stop-shoulder and hence determining the extent of rearward spring-urged movement of each released slide.

19. A construction according to claim 18 wherein the keyboard mechanism has a ten-key keyboard and has mechanism whereby successive depression of keys causes progressive data transfer from right to left of the rows of stop-pins whereby data fed in by the first key depression is progressively shifted with each successive key depression to successively leftward rows of stop-pins.

20. A construction according to claim 18 wherein the first plurality of slides are provided with re-setting means connected to the operating shaft for automatically returning all of the released spring-shifted slides to their original forwardmost catch-engaged position upon return rotation of the shaft following the carriage-depressing print-and-punch causing rotation of said shaft; and wherein means are provided for disengaging the re-setting means preliminary to the next print-and-punch operation.

21. A construction according to claim 20 wherein the re-setting means includes a pivotally mounted yoke having a laterally disposed cross-piece constructed and arranged to be swung so as to contact and return all of the spring-shifted slides to their forwardmost position; and re-setting linkage extending from the yoke to the crank arm of the operating shaft whereby return rotation of the shaft produces forward pivotal movement of the yoke and its cross-piece.

22. A construction according to claim 21 wherein the re-setting linkage comprises a pin carried by the yoke; a longitudinal slide arm having one end pivotally connected to the shaft crank arm; a roller for supporting the other end of the slide arm, the slide arm having a pair of generally parallel somewhat displaced lower bearing edges interconnected by a camming edge, said edges being successively shifted into operative contact with the roller as the slide arm is moved by rotation of the shaft and crank arm, the more forward of the two bearing edges being at a higher level than the other and being adjacent the yoke pin and having a notch which is capable of fitting down over and engaging the yoke pin when the forward higher-level bearing edge rests on the roller but which is raised out of engagement with the yoke pin when longitudinal movement of the slide arm causes the camming edge to contact the roller and thereafter to transfer roller contact to the lower-level bearing edge, the notch being maintained out of engagement with the yoke pin as long as the lower-level bearing edge rides on the roller in either direction.

23. A construction according to claim 22 wherein means are provided for releasably locking the yoke in its forward position, said locking means including a second pin carried by the yoke; a pivotally mounted lever arm having a notch constructed to be lowered into engagement with the second yoke pin when the yoke is forwardly shifted; means normally urging said lever arm downwardly into pin-engaging relationship with the forwardly shifted yoke; and means including a depressible release key connected with said lever arm for raising said lever arm out of engagement with the second yoke pin.

24. A construction according to claim 23 wherein the lever arm is provided with releasable locking means to prevent its disengagement with the second yoke pin; and wherein the card-holding means is constructed and arranged to release the lever arm locking means only when the card-holding means is fully shifted to correct imprinting and perforating position.

25. A construction according to claim 23 wherein means are provided for repeat operation of the machine with the data originally fed to the keyboard mechanism, said means including a releasable lock for retaining the release key in depressed lever-arm-elevating position thereby preventing locking of the yoke in its forward shifted position.

26. A construction according to claim 10 wherein the carriage actuating means also includes a wedge arm pivotally connected at one end to the crank arm and extending longitudinally therefrom and having upper and lower outwardly tapered bearing edges at its other end; a roller mounted on the base and raised relative thereto; a roller mounted on the carriage forward of the carriage pivot and below the level of the base roller; said wedge arm extending between said rollers with its tapered edges in contact therewith; rotation of the operating shaft and crank arm causing longitudinal movement of the wedge arm whereby the tapered bearing edges produce a camming action forcing the forward end of the carriage to swing downward about its pivot.

27. A construction according to claim 13 wherein the selector mechanism also includes keyboard mechanism mounted on the carriage adjacent the front end thereof, said keyboard mechanism having a plurality of laterally spaced longitudinal rows of downwardly-directed extensible stop-pins, each row being located above the front portion of one of the first plurality of slides, operation of the keyboard mechanism causing selective downward extension of a stop-pin in one or more of the rows into proximity with the upper edge of the front portion of the corresponding slide, each of the first plurality of slides having an upwardly-directed stop-shoulder at its front end which contacts any downwardly extended stop-pin in the corresponding row so as to halt rearward movement of the slide; spring means separately urging each of the first plurality of slides for rearward movement relative to the carriage; catch means separately releasably holding each of said first plurality of slides in frontmost or forward position, said catch means engaging the stop-shoulder of each slide and being constructed and arranged selectively to release one or more of the first plurality of slides responsive to variable data fed to the keyboard mechanism; the extent of spring-urged rearward movement of each slide being governed by the location of the extended stop-pin in the corresponding row.

28. A construction according to claim 27 wherein the selector mechanism also includes a pivotally mounted yoke or the like; and means operatively connecting the yoke to the operating shaft so as to cause forward pivotal movement of the yoke upon return rotation of the shaft following the printing and punching operation, said yoke being constructed and arranged to return to forward position all of the rearwardly spring-shifted slides.

29. A construction according to claim 28 wherein each type-carrying member comprises a pivotally-mounted quadrant having a generally downwardly-directed convex type-bearing face.

30. A construction according to claim 29 wherein each quadrant is provided with a gear and wherein each of the first plurality of slides is provided with a rack operatively engaging the gear of the corresponding quadrant.

31. A construction according to claim 30 wherein each of the first plurality of slides comprises a lower generally horizontal main portion, a vertical portion extending upward from the main portion and constructed and arranged to be contacted by the resetting yoke, and an upper generally horizontal portion mounted on the vertical portion and carrying the rack for engaging the quadrant gear; and wherein each slide is spring-urged rearwardly by a coil spring having its front end connected to the vertical portion of the slide and having its rear end anchored to the carriage adjacent the rear end of said carriage.

32. A construction according to claim 31 wherein the operating shaft extends laterally of the carriage; and wherein the printing quadrants and gears are mounted in side-by-side relationship on said shaft and are journalled for rotation independently of the shaft.

33. A construction according to claim 28 wherein the interconnecting means between the two pluralities of slides comprises a rack formed on each of the first slides; a plurality of longitudinally spaced transverse shafts mounted adjacent the rear end of the carriage; a pair of keyed rotatable pinions mounted on each of said transverse shafts; and a longitudinally disposed rack operatively associated with each of the second plurality of slides, one of each pair of keyed pinions being engaged with the rack of one of the first slides while the other of said pair is engaged with the rack of the corresponding one of the second plurality of slides.

34. A construction according to claim 33 wherein the slide racks and pinions are so arranged that rearward movement of one of the first plurality of slides causes frontward movement of the corresponding one of the second plurality of slides and vice versa.

35. A construction according to claim 13 wherein the individual punches of the gang-punch mechanism are each independently spring-tensioned to normal elevated position, and wherein the carriage is provided with a generally horizontal apertured plate having rows of holes which are co-axial with but somewhat oversize relative to the several individual punches, the normal elevated positions of the upper ends of the individual punches being within but not upwardly beyond the holes, and wherein each of the second plurality of slides is provided with a downwardly-directed foot portion constructed and arranged to rest on and move slidably along the top of the plate, the foot portion being slightly oversize relative to the individual holes so that it cannot drop into any of the holes, longitudinal movement of the slide causing its foot portion successively to cover individual holes in the corresponding row, downward movement of the carriage and its plate permitting the oversize uncovered holes to pass downward beyond the upper ends of the corresponding punches which still remain in normal elevated spring-tensioned non-perforating position, the punch corresponding to the hole which is covered by the foot portion being locked to the plate and the carriage so that it is forced downward with the carriage into perforating relationship with the card.

36. A construction according to claim 35 wherein a second gang punch perforating mechanism is mounted on said base adjacent the first gang punch mechanism and comprises a plurality of laterally spaced longitudinal rows of individual vertical punches each normally independently spring-tensioned to elevated position, and wherein the apertured plate is also provided with rows of holes which are co-axial with but somewhat oversize relative to the individual punches of the second punch mechanism, and wherein a control key having selectively disposed downwardly directed projections is constructed and arranged to be removably inserted above the apertured plate so as selectively to cover one oversize hole in one or more of the second plurality of rows and thereby to lock the corresponding punch to the plate and the carriage so that it is forced downward with the carriage into perforating relationship with the card, whereby fixed data fed to the machine from the control key is punched into the card simultaneously with the variable data from the selector mechanism; the remaining punches of the second plurality being maintained in normal elevated spring-tensioned non-perforating position with the uncovered oversize holes passing downward beyond the upper ends of said elevated punches during the downward carriage movement.

37. A construction according to claim 36 wherein the two gang punch mechanisms are located side-by-side and are constructed and arranged to punch correspondingly relative to a given edge of the card.

38. A construction according to claim 34 wherein each of the second plurality of slides is connected to one of a plurality of laterally spaced racks movably mounted on the carriage; and wherein each of the first plurality of slides is provided with a rack, the two sets of racks spaced laterally from each other, and wherein a plurality of longitudinally spaced transverse shafts are mounted on the carriage in crossing relation to the two sets of racks, and wherein a pair of keyed pinions are mounted on each transverse shaft, one pinion of each pair being operatively engaged with the rack of one of the first plurality of slides while the other pinion of the pair is operatively engaged with the rack of the corresponding one of the second plurality of slides, whereby movement of any one of the first plurality of slides causes movement of the corresponding one of the second plurality of slides.

39. A construction according to claim 38 wherein the transverse shafts are located adjacent the rear end of the carriage, and wherein the racks of the two pluralities of slides are constructed and arranged to engage generally diametrically opposed portions of the respective pinions of the pairs, whereby rearward movement of one of the first plurality of slides causes forward movement of the corresponding one of the second plurality of slides, and vice versa.

40. A printing and perforating machine comprising a plurality of type-carrying members, each being independently movable into selected printing position; perforating mechanism having a plurality of spaced rows of individual perforating punches, each punch being independently movable into perforating position; selector mechanism operatively connected to the type-carrying members and the perforating mechanism for setting said members and said perforating mechanism responsive to variable data fed to the machine; said selector mechanism including a plurality of slides, each operatively connected to a separate type-carrying member, a second plurality of slides, each operatively associated with a separate row of perforating punches, and means operatively interconnecting each of the first plurality of slides with a separate one of the second plurality of slides so that each interconnecting pair of slides move together; actuating means for simultaneously causing imprinting movement of the pre-selected type-carrying members and perforating movement of the pre-selected perforating punches; a second perforating mechanism disposed in adjoining relationship to the first mentioned mechanism and also having a plurality of spaced rows of individually independently movable perforating punches; and key means removably insertable over the perforating punches of said second perforating mechanism, said key means having means for engaging pre-selected punches of said second perforating mechanism for causing movement of said pre-selected punches upon operation of the actuating means.

References Cited in the file of this patent

UNITED STATES PATENTS

| | | |
|---|---|---|
| 2,050,745 | Woodruff | Aug. 11, 1936 |
| 2,293,713 | Connor | Aug. 25, 1942 |
| 2,708,873 | Braun | May 24, 1955 |
| 2,803,187 | Hart | Aug. 20, 1957 |
| 2,858,889 | Kent | Nov. 4, 1958 |